United States Patent [19]
Swartz

[11] 3,821,026
[45] June 28, 1974

[54] SCRAP METAL RECOVERY METHOD AND APPARATUS

[76] Inventor: Edwin H. Swartz, P.O. Box 1033, Sanford, N.C. 27330

[22] Filed: Jan. 5, 1973

[21] Appl. No.: 321,264

Related U.S. Application Data

[63] Continuation-in-part of Ser. No. 196,126, Nov. 5, 1971, abandoned.

[52] U.S. Cl.............................. 134/2, 134/19, 29/403
[51] Int. Cl...................... C22b 7/00, H01b 15/00
[58] Field of Search................. 134/2, 19; 75/44 S; 29/403; 137/2, 6, 90; 236/15 E; 110/32 C; 23/230 A; 431/41; 432/24

[56] References Cited
UNITED STATES PATENTS

| | | | |
|---|---|---|---|
| 3,097,687 | 7/1963 | Fannin | 431/41 |
| 3,225,428 | 12/1965 | Deitz | 134/2 |
| 3,404,875 | 10/1968 | Hall | 266/37 |
| 3,448,509 | 6/1969 | O'Reilly | 134/2 |
| 3,650,830 | 3/1972 | Mathis | 134/19 |
| 3,697,257 | 10/1972 | Perry | 75/64 |

OTHER PUBLICATIONS

Grabbe et al., "Handbook of Automation, Computation & Control," Vol. 3, John Wiley and Sons, New York (1961), p. 10-03.
Grassie, "Chemistry of High Polymer Degradation Processes," Interscience Publishers Inc., New York (1956), p. 72.
Koleske et al., "Poly(Vinyl Chloride)," Gordon and Breach Science Publishers, New York (1969), p. 63.

*Primary Examiner*—Morris O. Wolk
*Assistant Examiner*—T. W. Hagan
*Attorney, Agent, or Firm*—Clarence A. O'Brien; Harvey B. Jacobson

[57] ABSTRACT

Plastic coated scrap metal heated within a vented combustion chamber to cause decomposition of the plastic without adversely affecting the metal core with respect to its subsequent separation from the decomposed plastic and recovery as a substantially pure metal product. A fuel gas mixture is fed at a controlled rate to the combustion chamber to initially elevate the temperature of the chamber to an optimum value that is then maintained constant. The products of combustion form a non-oxidizing atmosphere in the chamber within which the desired decomposition of the plastic occurs.

8 Claims, 7 Drawing Figures

3,821,026

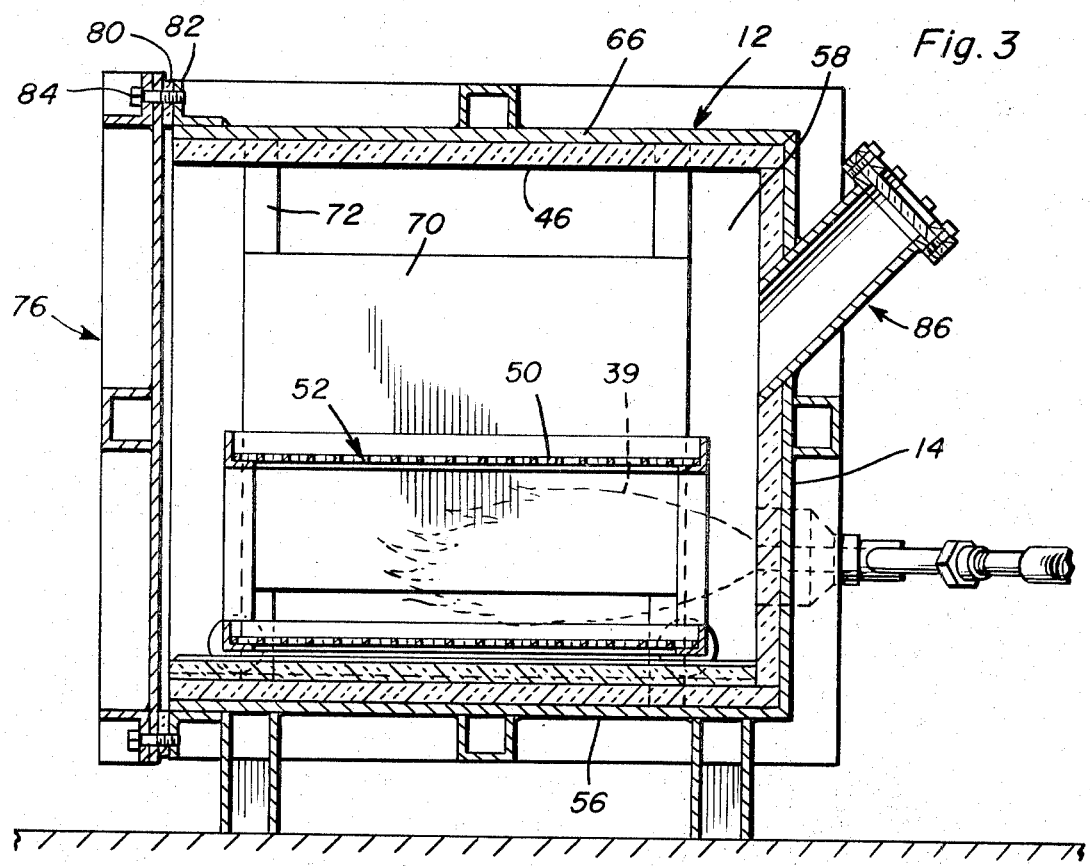
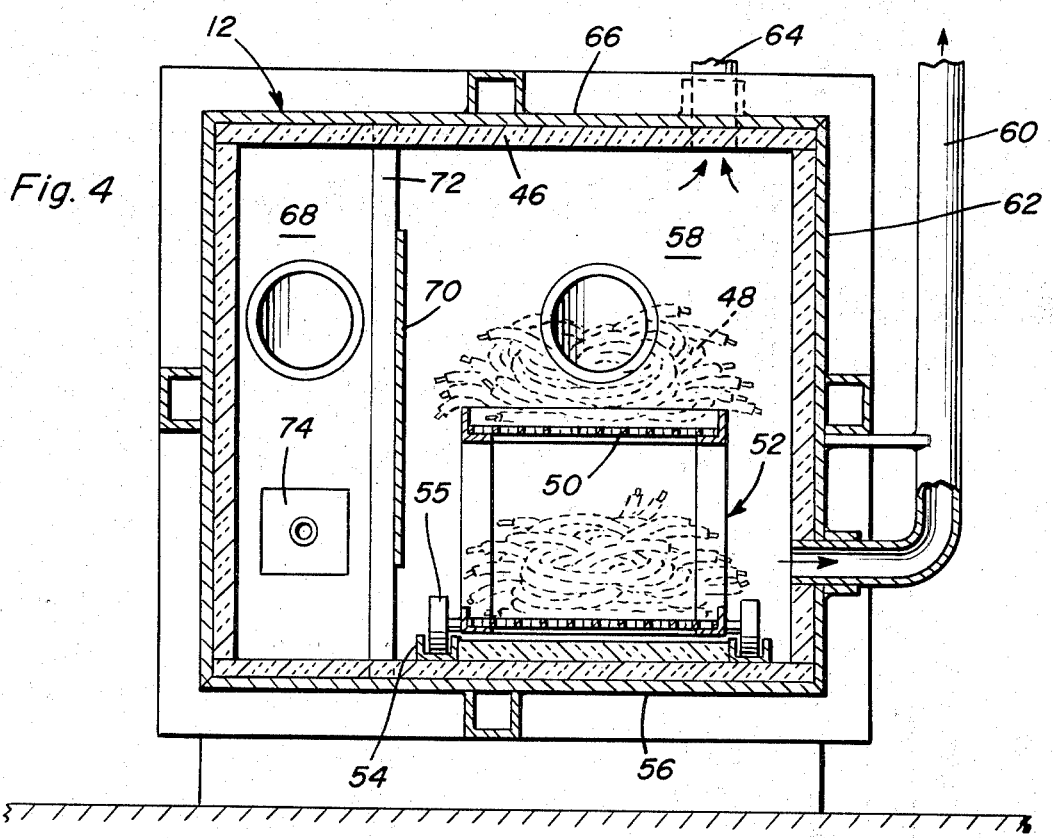

3,821,026

SCRAP METAL RECOVERY METHOD AND APPARATUS

This invention relates to the recovery of metal from plastic coated scrap material such as insulated copper wire, and this application is a continuation-in-part of my prior copending application Ser. No. 196,126, filed Nov. 5, 1971, now abandoned.

The recovery of metal from scrap material is often made economically unfeasible because of the difficulty in removing or separating plastic coatings from the metal. One well known and basic method that has been used for this purpose involves the heating of the scrap material in a non-oxidizing atmosphere to a temperature below the melting point of the metal to be recovered, but sufficiently high to cause decomposition of the plastic coating. The decomposed plastic is then more readily separated from the metal by physical means. This type of metal recovery method has been disclosed, for example, in U.S. Pat. Nos. 3,225,428, 3,448,509 and 3,615,815 and also in my prior copending application, aforementioned.

A particular problem peculiar to recovery of copper from plastic insulated wire of the small diameter strand type, is the affect of heating on the copper strands making it brittle and difficult to separate from the decomposed plastic. It has been found that this problem can only be dealt with by precise control over the temperature and the gaseous atmosphere within which the plastic decomposes so as to avoid any adverse affect on the physical property of the copper core which must remain sufficiently cohesive when subjected to the physical conditions applied to separate the decomposed plastic. In one example disclosed in my prior copending application, aforementioned, a heated gas, inert with respect to the plastic, was used for this purpose to both controllably heat the plastic and create a non-oxidizing atmosphere for the decomposition process. The present invention, on the other hand, deals specifically with the generation of such a relatively inert gaseous atmosphere for decomposition of the plastic, attainment of an optimum temperature, and maintenance of conditions resulting in the efficient and economical recovery of a substantially pure metal product.

In accordance with the present invention, a suitable non-oxidizing atmosphere was produced within a heating chamber by combustion of a gaseous fuel mixture. The concentration of gaseous products of combustion and decomposition of the plastic coating on the metal to be recovered, was controlled by the supply of gaseous fuel to the heating chamber and the venting of such combustion and decomposition products. Also, by regulating and changing the inflow rate of fuel in accordance with a preset program, the total amount of heat generated by both fuel combustion and plastic decomposition was limited to a value below the melting point of the copper and to maintain an optimum temperature under which the desired treatment of the scrap material was achieved. Thus, scrap material loaded into an insulated and vented processing chamber, was heated during an initial warm-up period by combustion of a mixture of natural gas and air supplied to a flame block at a predetermined maximum inflow rate. The temperature increased to an upper optimum value for the quantity of scrap material being treated within the processing chamber and was maintained constant for the remainder of the operating cycle within the processing chamber. The warm-up period terminated when decomposition of the plastic began occasioned by release of heat augmenting the heat generated by combustion. The supply of fuel was then decreased from the maximum inflow rate to reduce the heat generated by combustion by a variable amount necessary to maintain the optimum heating temperature in the chamber. The chamber volume for a given quantity of scrap material and the venting ports were dimensioned so as to maintain a suitable concentration of combustion and decomposition products in the chamber under the aforesaid optimum temperature conditions.

A detailed description of the apparatus associated with the invention now follows in conjunction with the appended drawings in which:

FIG. 3 is a side sectional view taken substantially through a plane indicated by section line 3—3 in FIG. 2.

FIG. 4 is a front section view taken substantially through a plane indicated by section 4—4 in FIG. 1.

Figure 1:
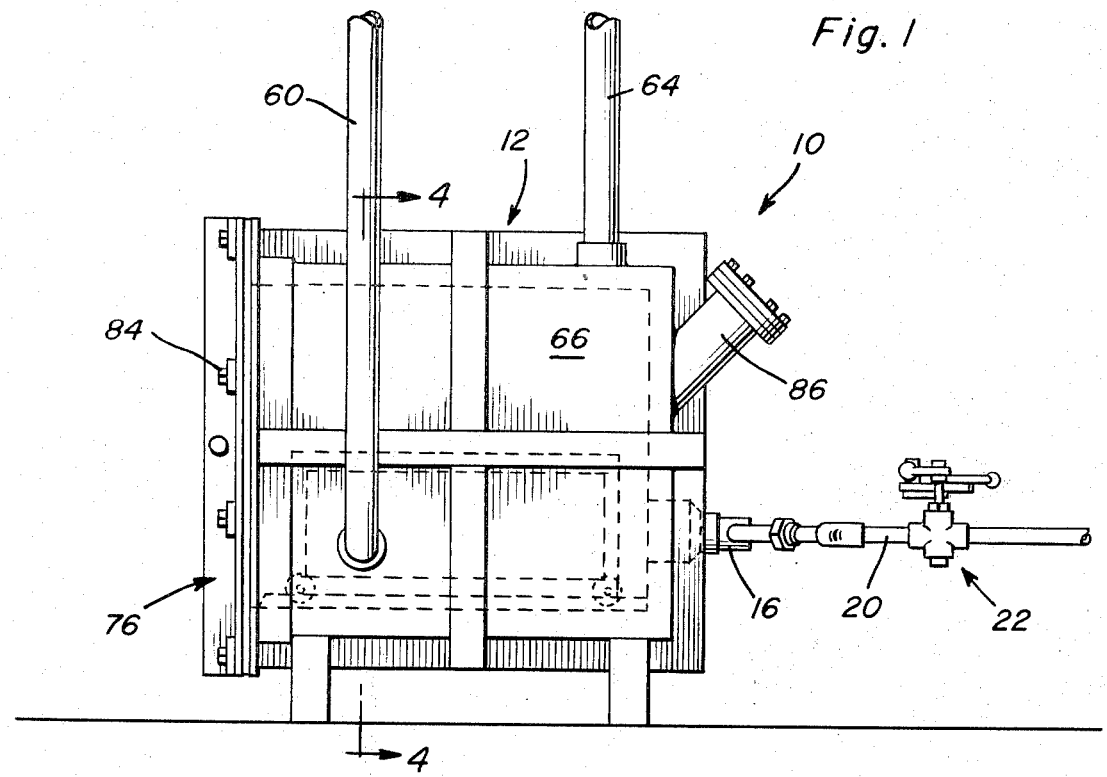
FIG. 1 is a side elevation view of the apparatus associated with the present invention.
Figure 2:
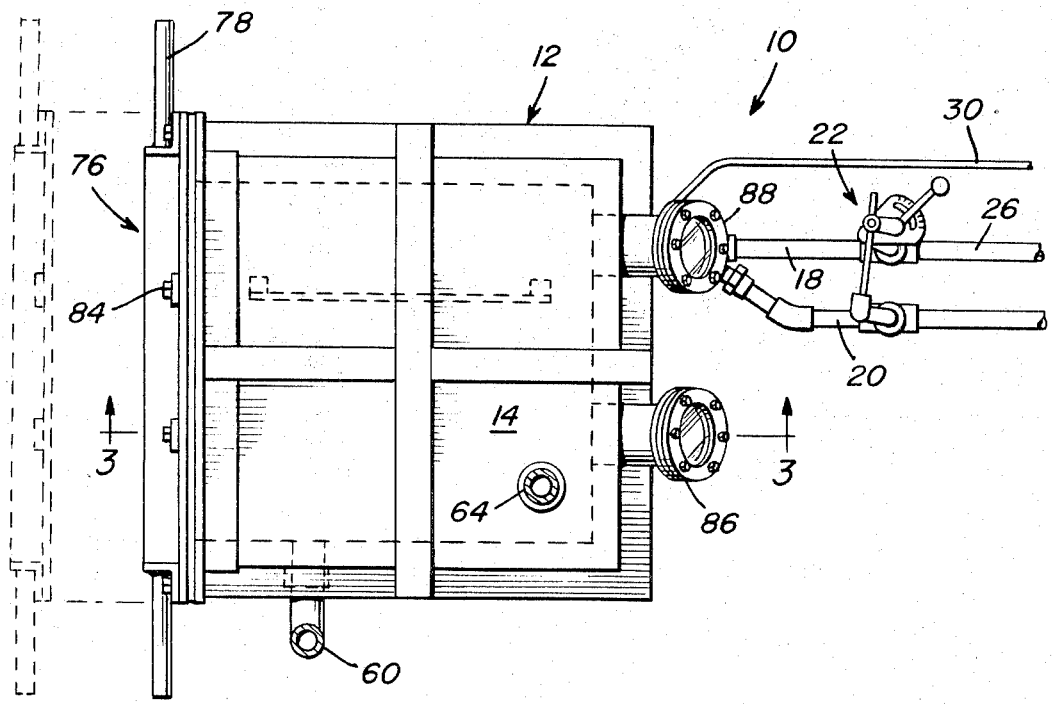
FIG. 2 is a top plan view of the apparatus shown in FIG. 1.
Figure 5:
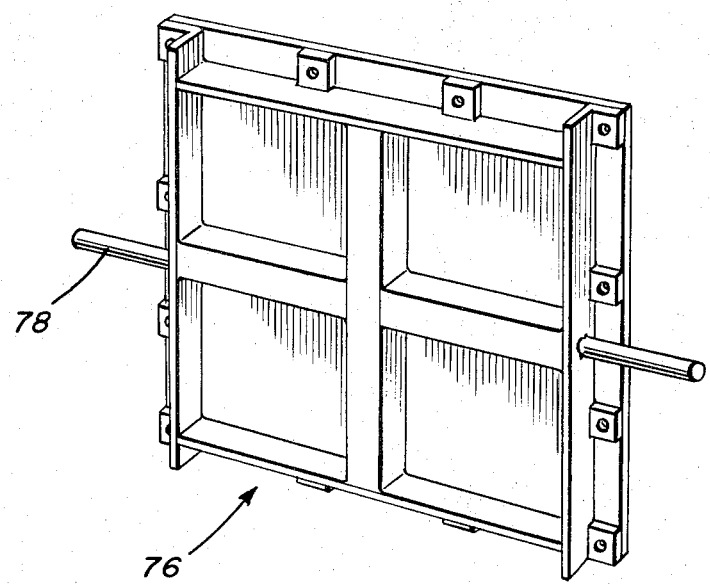
FIG. 5 is a perspective view of the processing chamber cover associated with the apparatus shown in FIGS. 1, 2 and 3.
Figure 6:
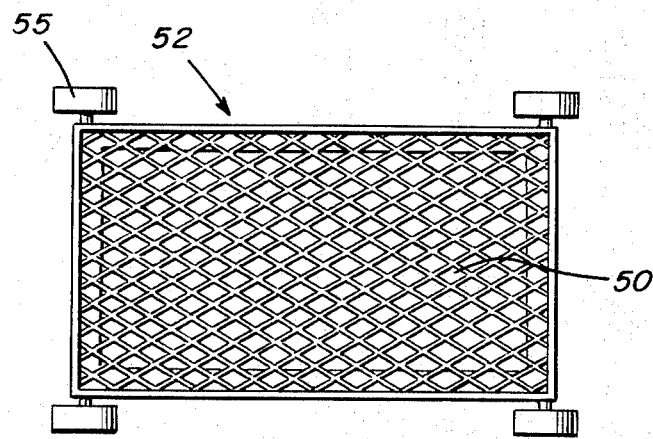
FIG. 6 is a top plan view of a work holding cart shown in FIGS. 3 and 4.
Figure 7:
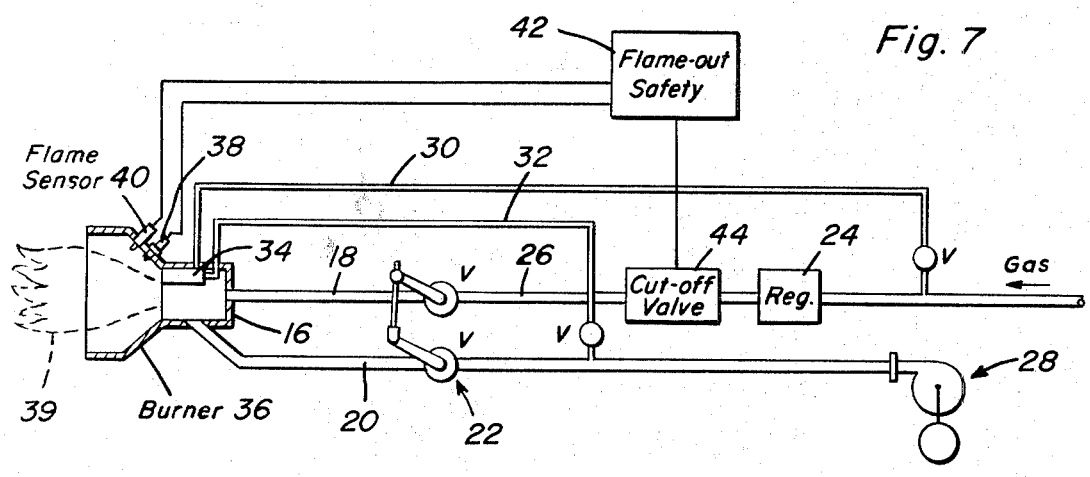
FIG. 7 is a schematic diagram of the feed supply and control system associated with the apparatus.

Referring now to the drawings in detail, FIGS. 1 and 2 show one embodiment of apparatus actually utilized in practicing the method of the present invention. The apparatus generally referred to by reference numeral 10 includes a processing chamber housing generally denoted by reference number 12 having a rear wall 14 from which a fuel mixing chamber 16 extends. Gas and air supply conduits 18 and 20 are connected to the mixing chamber for injecting natural gas and air at a fixed air to gas ratio determined by a gas ratio proportioning valve assembly 22 of well known construction and operation. The natural gas is fed to the valve assembly 22 from a commercially available source through a gas pressure regulator 24 and conduit 26 while the air is fed to the valve assembly 22 from a motor driven air compressor 28 as diagrammatically shown in FIG. 7. Pilot gas and air tubes 30 and 32 also supply gas and air to a pilot burner 34 mounted on a main burner 36 which projects into the processing chamber through wall 14 and to which the mixing chamber 16 is connected. An ignition spark plug 38 and a flame sensor 40 are also mounted on the main burner for respectively igniting the burner and detecting extinction of its flame 39. The ignition spark plug and sensor are wired to a safety control circuit panel 42 to cut off the supply of fuel through valve 44 if the flame is extinguished.

As more clearly seen in FIGS. 3 and 4 the processing chamber housing 12 includes reinforced outer walls internally lined with asbestos insulation 46. The front end of the chamber is open to accommodate loading of scrap material 48 on wire mesh trays 50 supported on a wheeled cart 52. The cart 52 is positioned within the housing 12 by means of tracks 54 receiving the cart rollers 55. The tracks are mounted on the floor wall 56 of the housing within a work treating space 58 that is vented to atmosphere by a side vent 60 extending through one of the side walls 62 and a top vent 64 extending through the top wall 66. The space 58 is separated from a combustion space 68 by means of a baffle plate 70 secured to vertical posts 72 extending between the floor and top walls of the housing. The flame 39 produced by combustion of the fuel mixture issues into the space 68 from a flame block 74.

The open end of the housing is adapted to be closed by a reinforced cover 76 having handles 78 extending laterally therefrom. The cover seals the opening to the housing by abutment with a peripheral seal 80 on the sealing flange 82 of the housing to which the cover is secured by a plurality of bolt assemblies 84. Visual inspection window assemblies 86 and 88 extend upwardly from the rear wall 14 to permit observation of conditions within the spaces 58 and 68 while the housing is closed by the cover 76 including the observation of temperatures by radiation sensors for example, to monitor and control conditions as hereinafter set forth. This is a technique well known to those skilled in the art and in itself forms no part of the present invention.

In one specific example, ten pounds of scrap wire was loaded into space 58 of the processing chamber. The wire was of a type coated with a polyethylene insulation and had a fine strand copper core. The work treating and combustion spaces 58 and 68 were each 6 cubic feet in volume. The loaded processing chamber was sealed and an operating cycle begun with the chamber at room temperature. A fuel mixture of a substantially constant air to gas ratio of 8:1 was set through valve assembly 22 for the entire operating cycle.

The processing chamber was heated by combustion of the natural gas in the fuel mixture within space 68 during an initial warm-up period of 5 minutes duration. The gas was supplied to the combustion space at a constant inflow rate of 250 cubic feet per hour during the warm-up period to raise the temperature within the chamber to an optimum value of approximately 800° F. At the end of this warm-up period, decomposition of the plastic insulation began.

Upon termination of the warm-up period, the inflow rate of fuel gas was decreased by varying amounts to a minimum value of 20 cubic feet per hour because of the heat released by decomposition of the plastic insulation. The optimum temperature of 800° F. was thereby maintained substantially constant for the remainder of the operating cycle of 20 minutes duration. During the 20 minute period, the flow of combustion and decomposition products through the vented chamber space 58 was such as to produce a desirable non-oxidizing atmosphere.

At the end of the operating cycle of 25 minute duration, the scrap material was removed by means of the tray carrying cart and the decomposed plastic insulation in the form of an ash residue was readily removed or separated from the copper cores mechanically. The use of vibrators, rollers or high pressure liquid sprays for this purpose is contemplated. In separating the copper strands from the decomposed plastic, there was no crumbling of the metal and a substantially pure metal product was easily recovered.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a method of treating scrap material having a metallic core and a decomposable, non-metallic coating, to facilitate removal of the coating and recovery of a substantially pure metallic product; the steps of: placing the scrap material in an insulated treating zone; heating said treating zone by combustion of a gaseous fuel therein to cause decomposition of the coating; regulating the inflow of the gaseous fuel during combustion to limit increase in temperature to an optimum value below the melting point of the metallic core; and venting the treating zone to maintain a predetermined concentration of combustion and decomposition products forming a non-oxidizing atmosphere in the treating zone of said optimum temperature value, said step of regulating the inflow of the gaseous fuel including: initially conducting the gaseous fuel to the treating zone at a maximum flow rate until decomposition of the coating begins at said optimum temperature; then reducing the flow rate of the gaseous fuel as a function of heat released by decomposition to maintain said optimum temperature substantially constant within the treating zone.

2. The method of claim 1 wherein said optimum temperature is approximately 800° F.

3. The method of claim 1 wherein said metallic core is copper and the coating is a polyethylene plastic.

4. The method of claim 1 wherein said gaseous fuel is a mixture of natural gas and air at a selected ratio resulting in said predetermined concentration of combustion and decomposition products in the treating zone.

5. The method of claim 4 wherein said optimum temperature is approximately 800° F.

6. The method of claim 5 wherein said scrap material is copper wire and the coating is a polyethylene insulation.

7. In a method treating scrap material having a metallic core and a decomposable, non-metallic coating, to facilitate removal of the coating and recovery of a substantially pure metallic product, the steps of: placing the scrap material in a confined treating zone; generating heat within the treating zone by combustion of a gaseous fuel supplied thereto at a substantially constant flow rate until the decomposition of the coating begins; and then varying the flow rate of the gaseous fuel as a function of heat release by decomposition to maintain a substantially constant temperature within the treating zone; and including the step of venting the treating zone during combustion to maintain a predetermined concentration of combustion and decomposition products forming a non-oxidizing atmosphere within the treating zone at said substantially constant temperature below the melting point of the metallic core.

8. The method of claim 7 wherein the scrap material is exposed to the heat within the treating zone while in a substantially stationary condition.

* * * * *